United States Patent
Yoked

(10) Patent No.: US 6,307,919 B1
(45) Date of Patent: *Oct. 23, 2001

(54) REMOTE CONTROLLED ELECTRONIC PRICE TAG

(76) Inventor: Yehuda Yoked, 24 Norman Pl., Tenafly, NJ (US) 07670

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,839

(22) Filed: May 29, 1998

(51) Int. Cl.$^7$ .................................... G06K 15/00
(52) U.S. Cl. ................ 378/492; 235/383; 235/492
(58) Field of Search ....................... 235/383, 385, 235/378, 454, 492, 380; 364/464.01, 478.01, 478.03

(56) References Cited

U.S. PATENT DOCUMENTS

| | | | |
|---|---|---|---|
| 4,754,418 | * 6/1988 | Hara | 235/380 |
| 4,876,441 | * 10/1989 | Hara et al. | 235/488 |
| 5,111,196 | * 5/1992 | Hunt | 235/383 |
| 5,151,684 | * 9/1992 | Johnsen | 340/572 |
| 5,172,315 | * 12/1992 | Poland et al. | 364/401 |
| 5,537,126 | * 7/1996 | Kayser et al. | 345/1 |
| 5,557,096 | * 9/1996 | Watanabe et al. | 235/492 |
| 5,587,703 | * 12/1996 | Dumont | 340/572 |
| 5,697,061 | * 12/1997 | Krueger et al. | 235/383 X |
| 5,793,029 | * 8/1998 | Goodwin, III | 235/475 X |
| 5,841,365 | * 11/1998 | Rimkus | 340/825.35 |
| 5,861,817 | * 1/1999 | Palmer et al. | 344/825.35 |
| 5,914,670 | * 6/1999 | Goodwin, III et al. | 235/385 X |

FOREIGN PATENT DOCUMENTS 7-272122 * 10/1995 (JP).
8-16111 * 1/1996 (JP).

* cited by examiner

Primary Examiner—Karl D. Frech
Assistant Examiner—Diane I. Lee
(74) Attorney, Agent, or Firm—Gottlieb, Rackman & Reisman, P.C.

(57) ABSTRACT

An electronic price tag is adapted for wireless adjustment, which consists of a display placard mounted to the goods at, for example, a point of manufacture for the goods; a plurality of price display fields on the placard; a receiver/decoder horn mounted to the placard for receiving signals from a remote location and decoding same to be inputted to the price display field. Additionally, the price tag of the present invention permits the retailer to maintain in confidence and secrecy price information pertaining to the specific goods, i.e. the goods are not routed through a supplier or other third parties that would obtain knowledge of the retailer's pricing strategy.

15 Claims, 6 Drawing Sheets

REMOTE CONTROLLED ELECTRONIC PRICE TAG

BACKGROUND OF THE INVENTION

1. Filed of the Invention

The present invention relates to electronic price display systems and more particularly, to price tags which are electronically controlled from remote locations.

2. Description of the Related Art

It is desirable in the retail industry to be extremely efficient when identifying and ordering goods through the various steps to the actual display of the goods and notification to the purchasing public of the price of such goods. Retailers, in particular, strive to reduce the time necessary to inventory ordered and back-ordered goods, as well as the actual sales of goods and remaining stock. In the highly competitive retail environment, every hour expended to document, inventory and display goods depletes the profits realized from sales of the goods. Retailers are particularly sensitive to the necessity of cost-effectiveness, especially when sales of products are necessary in order to turn over or clear out stock.

Usually, a retailer will order goods or products, commonly known as SKU's (stock keeping units), to be shipped from a manufacturer or distributor. A single SKU equals one of the particular goods. The goods arrive at the retailer in bulk, enclosed with invoices, bills of lading, or other transit documents that the retailer must review, collate and cross-check to determine that the goods he will pay for have indeed been delivered. A manufacturer ships the goods without price tags. This is because the manufacturer does not know what the goods will ultimately be priced at and what the actual demand will be that will dictate the ultimate price to the purchasing public.

The retailer then affixes a label or price tag to the goods bearing indicia pertaining to the particular product and store, i.e. store name, bar code, SKU, model number, size, color, etc. The tag is usually manually affixed to the product in the store and then distributed or racked at the appropriate area of the store for sale. After a specified period of time has elapsed since the display of the goods, those goods not sold must be put on sale or marked down to attract consumers so that the stock can be moved out of the store. This requires adjusting the original price and writing thereon the sale price. This may occur more than once, perhaps even two or three times, before the SKU is actually sold.

On certain occasions, a distribution center for the retailer or similarly owned retailers will affix the price tag to the product before it is shipped to a specific store or stores. During this procedure, and the time lag for the goods tagged at the distribution center and received at the retailer, the retailers' marketing (pricing) strategy is vulnerable to access by competitors. The potential for unauthorized access to the retailer's pricing strategy is increased due to the time lag, which could prevent the retailer from being first-in-time to offer a sale of highly competitive goods.

Procedures to indicate sales involve manually affixing sales tags over the original price on the price tag to notify consumers of the sale price. Many retailers still use a person to mark down a product for a sale.

In all the situations presented above, a tremendous amount of time is lost "tagging" the goods for sale and manually adjusting the price, in practically all instances downward, for the goods on sale.

Electronic display systems are known, some of which address certain of the disadvantages discussed above.

U.S. Pat. No. 4,139,149 to Crepeau et al discloses a computer controller connected to a series of hard wired display units.

U.S. Pat. No. 4,500,880 to Gomersall et al discloses a series of remote displays actuated by a computer but does not show individual price tags. Rather it shows pricing displays mounted on the edge of a shelf.

U.S. Pat. No. 4,727,368 to Larson et al discloses a series of remote lock boxes controlled by a central computer through radio frequencies and/or telephone lines.

U.S. Pat. No. 4,888,709 to Revesz et al discloses what appears to be a radio transmitted series of signals directed to remote displays located on shelves to control the pricing on the remote display.

U.S. Pat. No. 5,019,811 to Olson et al discloses a series of remote display units directed from a central system. The display units could not be used for individual price tags.

U.S. Pat. No. 5,121,563 to Connor et al discloses a display device useful for mounting cards or other items.

U.S. Pat. No. 5,572,653 to DeTemple et al discloses a hard wired grid controlled from a central source having a plurality of stations which then send infrared signals to display units or can be used to receive information from shopping carts and the like to indicate shoppers habits.

U.S. Pat. No. 5,715,622 to Giordano, Jr. discloses a shelf mounted display that receives radio frequency information by means of an antenna 24 and then displays the information on a display unit 22. This system is also intended for mounting on shelves.

However, among the known devices and systems, there still remains the inefficient task of mounting the price or display tag for the goods to the item for sale. The inefficient requirement of having to indicate price reductions manually on a price tag is still not addressed by the inventions above.

The above devices and systems do not display the sale price directly on the product in an electronic display being remotely controlled. Therefore, removal of a product or products from a specific rack or shelf area indicating the sale price of goods will leave purchasers confused as to the actual sale price of the goods.

The above devices and systems also do not permit consumers to view an item on sale displaying the original price and repetitive markdowns, so that the consumer will be encouraged to purchase the goods on sale.

It is therefore desirable to have the SKU's arrive at the retail establishment already having a price tag mounted thereto to reduce substantially the time required to process incoming goods and display same to the purchasing public. This, of course, as mentioned above, impacts tremendously on the merchants profits. The ability of a retailer to be able to handle incoming goods which already have price tags attached, coupled with being able to immediately display the goods without any further effort by the retailer and then to electronically adjust the price of the goods from a remote location so that the consumer sees the successive price adjustments with the goods, is highly advantageous both for its cost-effectiveness and maintaining a good rapport with consumers.

SUMMARY AND OBJECTS OF THE INVENTION

To overcome the disadvantages of known price tag devices and systems in the retail environment, there is provided an electronic price tag adapted for wireless adjustment, which consists of a display panel mounted directly to the product at the point of manufacture or at any point in the chain of commerce up to the actual location of retail sales; a plurality of price display fields on the panel; a receiver/decoder horn mounted to the panel for receiving signals and decoding same to be inputted to the price display fields; and a battery pack to provide power for the elements.

Additionally, the electronic price tag of the present invention permits the retailer to maintain in confidence and secrecy price information pertaining to the specific goods, i.e. the goods do not have to be routed through a supplier or other third parties that would affix the price tags to the manufactured items and have knowledge of pricing strategy. The price tag of the present invention substantially reduces, if not eliminates, the undesirable aspect of providing competitors with a way to obtain information regarding the price of particular goods prior to putting the goods on sale. Therefore, a sale price or the lowest price for the goods can be displayed at the last possible moment.

An additional feature also calls for the elements of the price tag being constructed and arranged as a composite unit.

A further feature calls for providing a price tag with a self actuating adhesive region so that the placard can be immediately mounted to packaging for the goods at the point of manufacture.

A still further feature calls for the electronic elements of the price tag according to the present invention being constructed and arranged as a composite unit which is set into a placard or platform of the price tag.

It is an object of the present invention to provide a price tag which is mounted to the goods for sale at point of manufacture for the goods.

It is another object of the present invention to provide an electronic price tag having a plurality of price display fields wirelessly adjustable from a remote location.

It is another object of the present invention to provide electronic display fields on a price tag which is constructed and arranged as a composite unit immediately mountable to goods at a point of manufacture for the goods.

It is another object of the present invention to provide a price display tag mounted to the goods at the point of manufacture capable of displaying the price, in addition to display retail indicia, such as the retailer's name, product name, size, color, bar code, etc.

It is another object of the present invention to provide a price tag which substantially reduces the amount of time necessary to document and inventory goods received by the retailer from the manufacturer.

It is another object of the present invention to provide a price tag which substantially reduces the amount of time necessary to adjust the price tag to indicate price changes for the goods.

It is an object of the present invention to provide a price tag which develops customer loyalty by showing the successive price changes of the goods.

It is an object of the present invention to provide a price tag which is easy to manufacture.

It is an object of the present invention to provide a price tag which is usable in all retail environments with all types of goods.

It is an object of the present invention to provide a price tag which can be chemically fastened to packaging for goods at point of manufacture.

It is an object of the present invention to provide a price tag which responds to signals from radio frequencies, microwaves or other wavelengths which are actuated by computer software at a remote location.

It is an object of the present invention to provide a price tag which permits the retailer to monitor sales and adjust marketing strategy in response to said sales without having to manually adjust each tag.

It is an object of the present invention to provide a price tag and a system therefor which can transmit necessary pricing data to all relevant merchandise.

It is an object of the present invention to provide an electronic price tag and system therefor which can be manipulated from the retailer's warehouse distribution center to signal the individual price tag at the remote retail locations and notify the individual retailers that such price manipulation has occurred.

It is an object of the present invention to provide an electronic price tag which is cheap enough to be disposable, but which can also he reused by replacing a battery.

It is an object of the present invention to provide an electronic price tag which can be programmed to lock in the lowest price for the product to comply with fair market sales.

It is an object of the present invention to provide an electronic price tag which permits pricing of the product to be completed upon first receiving the product at the retail site.

It is an object of the present invention to provide an electronic price tag that will be accepted by those retailers demanding SKU-s be "pre-priced" or "pre-tagged".

It is an object of the present invention to provide an electronic price tag which would prevent unauthorized switching of the prices for the product.

It is an object of the present invention to provide a price tag which has a replaceable power means such as a battery pack.

It is an object of the present invention to provide a price tag which is of a construction sufficient to withstand shipment with the goods over great distances.

It is an object of the present invention to provide a price tag which can be constructed of, for example, paper board, cardboard, or plastics.

It is an object of the present invention to provide a price tag which is easily removed from the goods after the goods have been purchased.

It is an object of the present invention to provide a price tag which is also adapted for being mounted to containers for goods at the point of manufacture for the goods.

It is an object of the present invention to provide a price tag which is easy and inexpensive to manufacture.

BRIEF DESCRIPTION OF THE DRAWINGS

For a more complete understanding of the present invention, reference may be had to the following detailed description of the invention taken in conjunction with the drawings herein, of which.

DETAILED DESCRIPTION OF THE PREFERRED EMBODIMENTS

Figure 1:
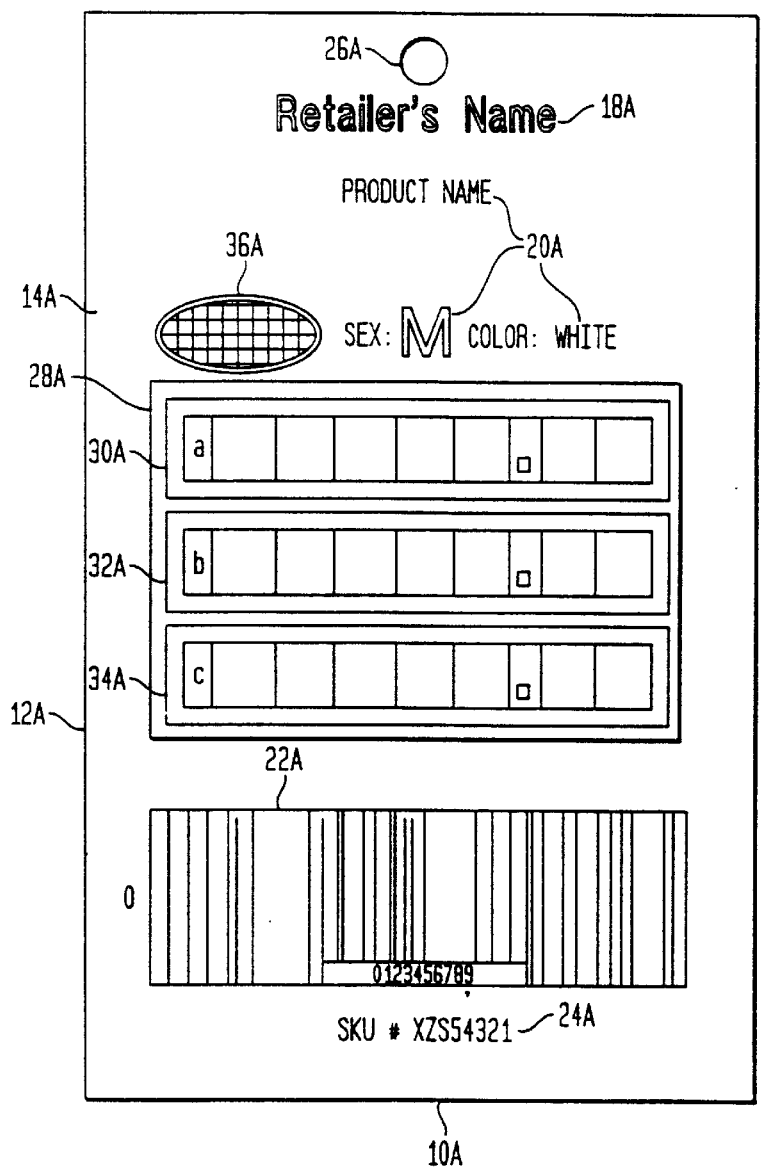
FIG. 1 is a front plan view of a first embodiment of an electric price tag according to the present invention.
Figure 2:
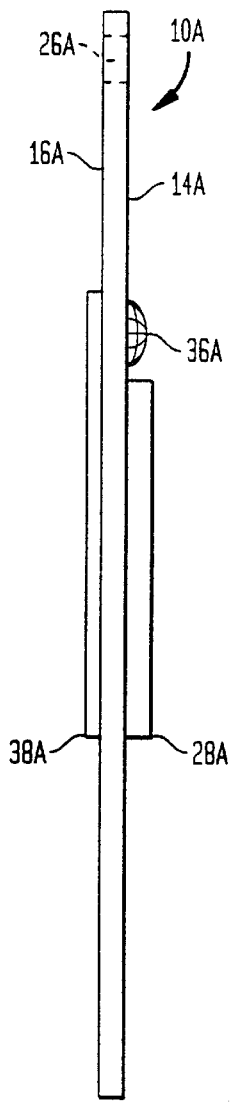
FIG. 2 is a side view of the electronic price tag shown in FIG. 1.

FIGS. 1–5 disclose embodiments of an electronic price tag which is affixed to goods at point of manufacture. The price tag according to the present invention is shown in FIGS. 1 and 2 generally as 10A; in FIGS. 3 and 4 generally as 10B, and in FIG. 5 generally as 10C.

In FIGS. 1 and 2, the first embodiment of the price tag 10A is shown. The price tag 10A includes a panel or platform 12A of non-conductive material. The material can be made of paper board, cardboard or polymers such as plastic, but does not have to be limited to these materials. It is preferred that the material is of a non-conductive nature so as not to interfere with the transmission and receipt of signals at the price tag 10A. Some flexibility of the panel 10A is preferred.

The panel 12A includes a front or display surface 14A, and a back surface 16A. The front surface 14A is conducive to receiving printed indicia thereon such as identifying indicia for the retailer's name 18A, product particulars 20A such as size and color, and a bar code 22A; and a stock keeping unit (SKU) number 24A.

An aperture 26A extends completely through the panel 12A to facilitate attaching the price tag 10A to the product at the point of manufacture.

The panel 12A can be of any size, shape or color to meet the needs of the product to be sold in the retail environment.

An electronic display region 28A is disposed on the front surface 14A of the panel 12A. The electronic display region 28A includes display fields 30A, 32A, 34A (30A–34A). The display fields are preferably liquid crystal displays (LCDs). The fields 30A–34A are electronically connected for separable operation or in conjunction with each other. The display fields 30A–34A are manipulated from a remote location to display a single price or succession of prices for the goods to which the price tag 12A is attached.

A receiver-decoder horn 36A is mounted to the front surface 14A of the panel 12A. The horn 36A receives wireless signals generated from a remote location and decodes the signals to be displayed in the fields 30A–34A of the display region 28A.

A battery pack 38A is mounted to the back surface 16A of the panel 12A to provide power for the horn 36A and the display fields 30A–34A of the display region 28A. The battery employed with the pack can be of the type which is replaceable or it can be disposable along with the rest of the price tag 10A.

The arrangement of the display region 28A, the horn 36A, and the battery pack 38A with respect to the panel 12A is such that these elements can be chemically fastened or press fit to the panel 12A.

The aperture 26A extending through the panel 12A is designed to, for example, receive a plastic lanyard (not shown) to be attached to the goods at the point of manufacture.

Figure 3:
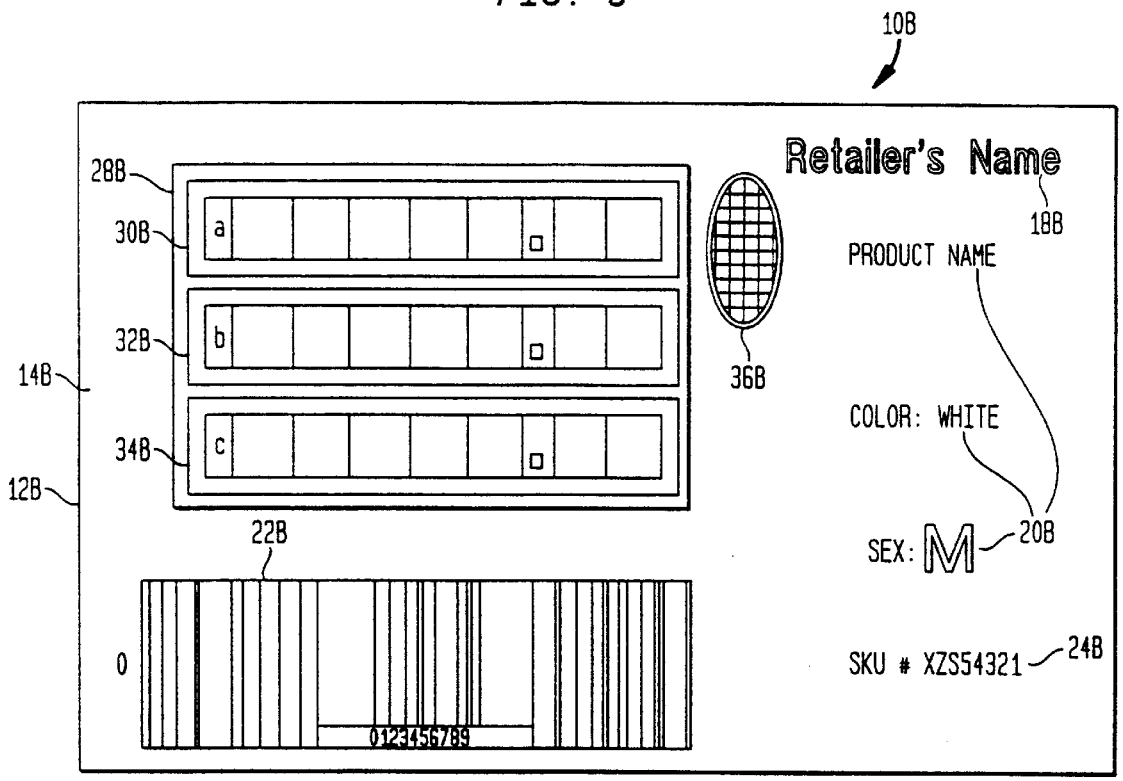
FIG. 3 is a front plan view of a second embodiment of an electronic price tag according to the present invention.
Figure 4:
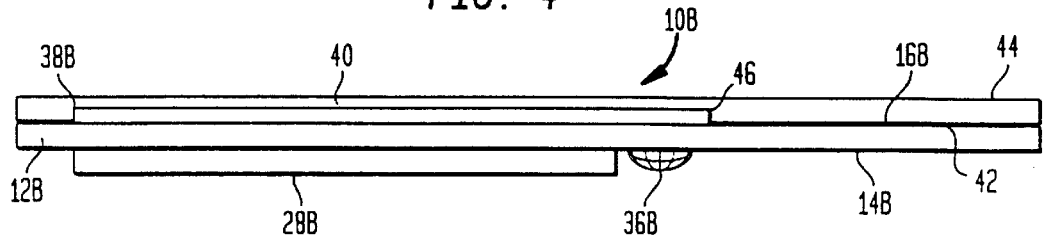
FIG. 4 is a side plan view of the electronic price tag shown FIG. 3.

FIGS. 3–4 disclose a second embodiment of the price tag 10B of the present invention. Elements for the second embodiment shown in FIGS. 3–4 which are the same as those elements referred to in FIGS. 1 and 2, are referred to by the same reference numeral including the capital letter "B". Elements in FIGS. 3–4 which corresponds to the same elements in FIGS. 1–2 operate the same unless otherwise indicated.

This embodiment can be chemically fastened to the products at point of manufacture, or the containers in which the products are shipped from point of manufacture. The battery pack 38B is mounted to the back 16B of the panel 12B in the manner described with reference to the first embodiment of FIGS. 1 and 2. However, in this embodiment, a sheet of adhesive 40 is provided to sandwich the battery pack 38B between the adhesive sheet 40 and the panel 12B. This is accomplished by having a front adhesive surface 42 of the adhesive sheet 40 pressed against the back 16B of the panel 12B to hold the battery pack 38B securely to the back surface 16B of the panel 12B.

In a preferred embodiment, a back surface 44 of the adhesive sheet 40 is also provided with an adhesive to chemically fasten the price tag 10B to the product at point of manufacture.

Another preferred embodiment includes the adhesive sheet 40 having an elongated channel 46 or groove sized and shaped to receive the battery pack 38B therein. In this manner of construction, when the front surface 42 of the adhesive sheet 40 is adhered to the back 16B of the panel 12B, there is presented a uniform and streamlined appearance of the back surface 44 of the sheet 40.

Figure 5:
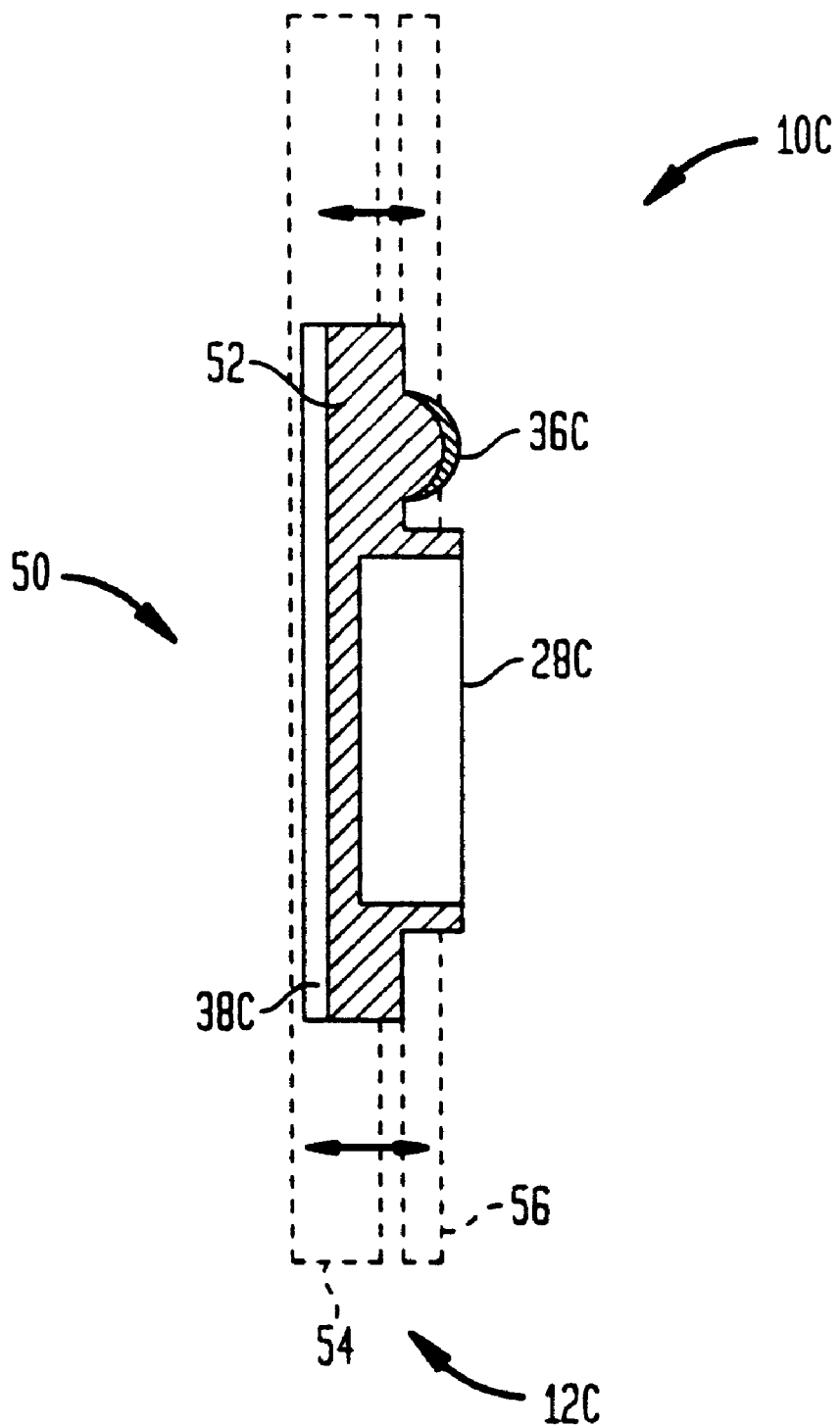
FIG. 5 is side view of a third embodiment of an electronic price tag according to the present invention.

In FIG. 5, still another embodiment of the electronic price tag according to the present invention is shown generally at 10C. In this manner of construction, elements which are the same as those shown with respect to the embodiment FIGS. 1–2 have the same reference number and include the letter "C". All elements operate the same unless otherwise indicated.

In the embodiment shown in FIG. 5, the placard or panel for the price tag is shown generally at 12C. An electronic display unit 50 consists of an LCD display region 28C, a receiver-decoder horn 36C and a battery pack 38C. Electronics for the display unit 50 are shown generally at 52. The display unit 50 is formed as an integral unit which is, for example, press fit into or sandwiched between a plurality of layers 54, 56 of the panel 12C. Other methods to mount the display unit 50 to the panel 12C can be employed.

Figure 6:
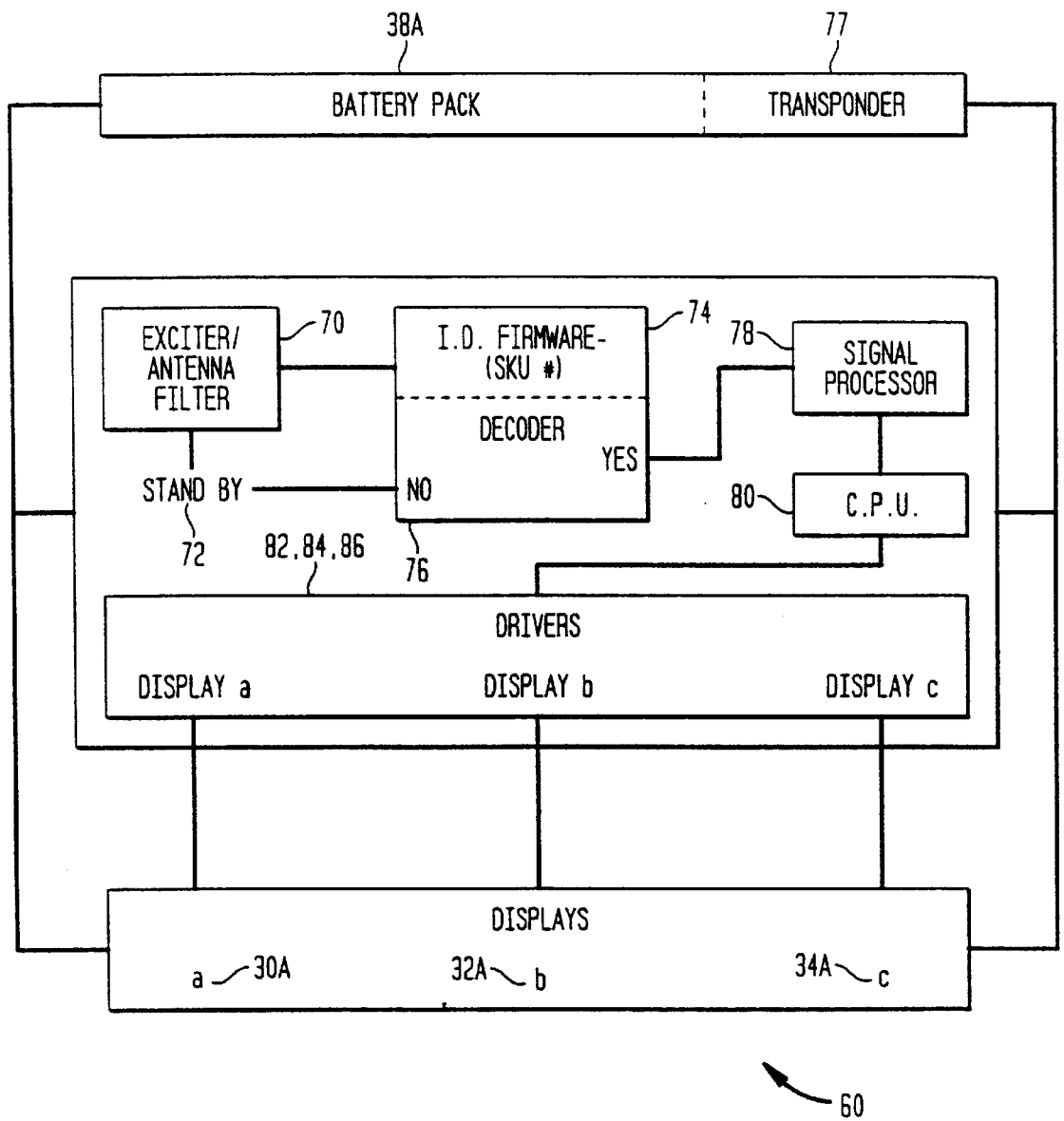
FIG. 6. is a block diagram of elements used in the electronic price tag of the present invention.
Figure 7:
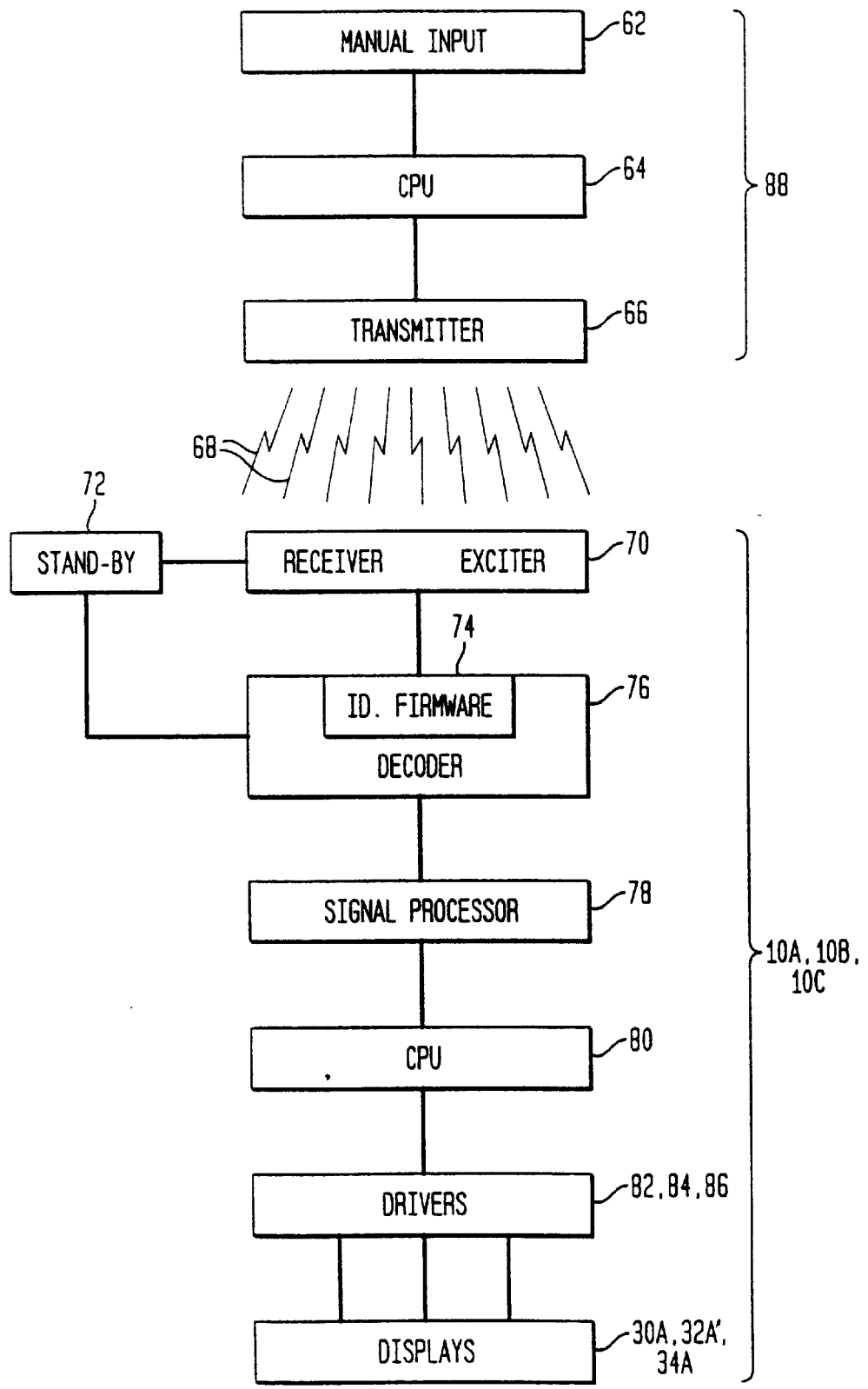
FIG. 7 is a system block diagram of the operation of the electronic price tag of the present invention.

Referring to FIGS. 6–7, a diagram 60 (FIG. 6) is shown for operation of the price tag 10A–10C of the present invention. The block diagram 60 pertains to all of the embodiments shown with respect to FIGS. 1–5. All of the elements in the schematic shown in FIG. 6 form part of the electronic price tag 10A–10C. By way of example only, reference numerals will be those used in association with the first embodiment shown in FIGS. 1–2.

At a remote location either in the retail store or at a distribution center for the retail store, manual input 62 shown in FIG. 7, is keyed into a central processing unit (CPU) 64 to store price data for later availability and manipulation. The digital data in the CPU 64 can then be processed by a signal processor into analog data for wireless transmission by a transmitter 66 to one of the embodiments of the electronic price tag 10A–10C. The wireless transmission 68 can be implemented by radio waves, microwaves, etc. In the cluttered environment of a retail store and large warehouses, line of sight wireless transmissions do not provide the necessary reliability, although they can be used to a certain extent.

The wireless analog data in the signal 68 is received by the horn 36A of the electronic price tag 10A. The horn includes an exciter 70 which is shown in FIGS. 6 and 7 the excited 70 includes an antenna and a filter which insures that only those wireless signals specific to the electronic price tag will be received. A standby element is provided which interconnects the exciter 70 with an I.D. identification firmware 74 having the SKU product number. The standby 72 remains passive until a signal 68 is received. The firmware 74 is essentially a microchip encoded with the product data (SKU number) specific to the product to which the electronic price tag 10A is attached. The firmware 74 is preferably incorporated into the electronic price tag 10A at the point of manufacture for the product. If a decoder 76 does not recognize the required code or SKU number for the product to activate the electronic price tag for price manipulation, the standby 72 does not actuate the tag electronics. If, on the other hand, the proper code is received, the wireless analog signal 68 is converted to digital data by a signal processor 78 for use with a central processing unit 80. The CPU transmits digital data to drivers 82, 84, 86 which correspond to the display fields 30A, 32A, 34A. The drivers select the display field to which the price information will be transmitted to stimulate the LCD fields so that the price selected is displayed in the fields.

As shown in FIG. 7, the electronic price tags 10A–10C are controlled from a remote location 88. The CPU 80 is used to select a particular one of the drivers 82–86 for a corresponding one of the displays 30A–34A.

If subsequent to the date of entry of the original price, the price for the goods is reduced, the Display "a" 30A can be maintained, and the second transmission of price data would immediately be displayed at Display "b" (32A).

Finally, if the product after a period of time has been reduced to its final sale price, that price will be displayed in Display "c" 34A. If the price in Display 34C is the lowest price, the system can be programmed to automatically "lock-in" this price, and no further adjustments to the price will be permitted.

Figure 8:
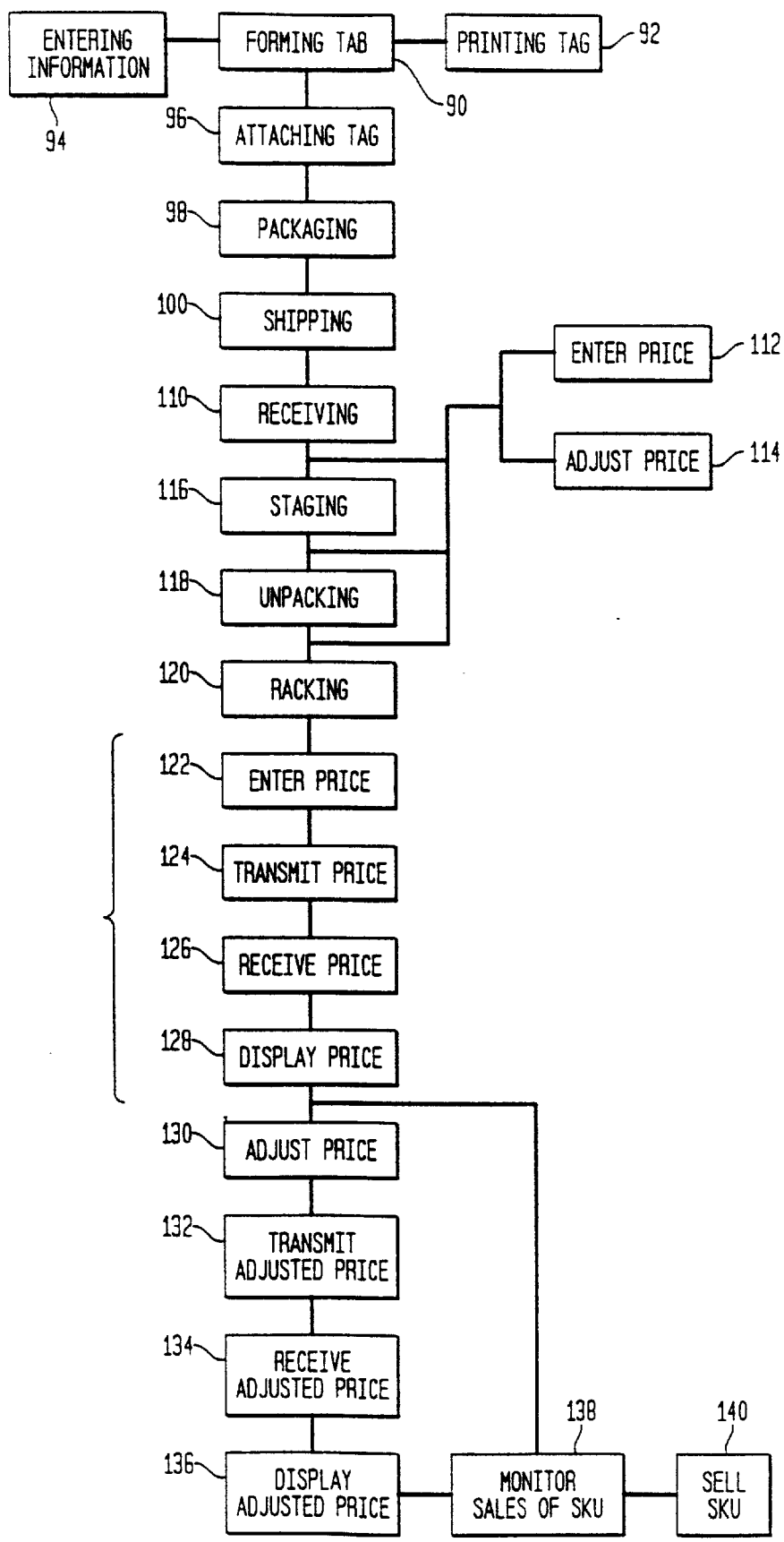
FIG. 8 is a flow chart of a method using the electronic price tag according to the present invention.

In FIG. 8, a flow chart is provided of a method according to the present invention. As discussed above, the cost-effectiveness of the method for the present invention derives from attaching electronic price tags to goods at their point of manufacture.

The first procedure in the method according to the present invention is forming 90 the tag to be attached to goods. The construction of the tag includes printing 92 retailer and product information on a surface of the electronic price tag. This information, including entering 94 information about the price, is done during the construction of the tag and may include the I.D. firmware 74 element as discussed above with respect to FIG. 6. The tag is then attached 96 to the specific product or SKU, after which the SKU or a plurality of the SKU's are packaged 98 for shipment 100 to a main distribution center for a retailer, or directly to the retailer.

At the distribution center for the retail store or the retail store, the package is received 110, where the package is staged 116 for unpackaging 118 prior to racking 120 of the SKU's. Immediately upon receiving 110 the package having the SKU or SKI's therein, the retailer has the option to enter the price 112 or adjust the price 114 of the SKU's from a remote location, such as a control office of the retailer. This may be necessary due to the unusually long period of time the packaging was in transit 100, or perhaps supply/demand of the product has been affected, thereby warranting a price change. The price entry 112 and adjustment 114 can be implemented immediately upon receiving 110 the package, i.e. the retailer does not have to remove the products from the packaging.

After it has been determined that the price does not require adjustment or the necessary price adjustment has been made, the packages are staged 116 for unpacking 118. During the staging 116 and unpacking 118 steps, and even after unpacking 118 of the products, the retailer can still manipulate the price as necessary.

Thereafter the products are racked 120, i.e. physically moved to the display racks or shelves in the retail establishment whereupon the consumers will review the products for sale.

Each one of the products for sale has attached to it its own individual electronic price tag which, now in the display aisle, can have its particular price adjusted. This is beneficial in that the same type of product may arrive over a period of time, f or example, six months, and it may be desirable to move the earlier shipped inventory under a sales program earlier than the inventory which has arrived more recently. In that regard, the retailer can again, while the product is on the shelf, enter 122 the particular price for the product from the control room of the retail establishment and transmit 124 the price to that particular product for sale. The price is received 126 by the electronic price tag for a particular product and immediately thereafter displays 128 that price selected by the retailer and transmitted from the remote location in the retail establishment.

It is understood that the central distribution site for the retail store or the chain of stores can also implement this sort of transmission to manipulate the prices of the goods.

After the particular product has been on the shelf for an amount of time deemed unusually long by the retailer, the retailer merely has to go to the control room and adjust 130 the price of the particular product that needs to be adjusted downward. The adjusted price is transmitted 132 to a specific one of the electronic price tags where it is received 134 and displayed 136 on the electronic price tag attached to the product that is to be on sale.

The retailer and the central distribution site for the retailer if one is used, can monitor 138 sales activity of the particular product at the reduced price. If it is determined that the price is still not low enough, the procedure begins all over again with the price being adjusted 130 for transmission 132 to the product. This procedure continues until the product is sold 140.

In certain industries, fair market pricing applies. In such a market, the manufacturer or controller of the product sale price under a contract with the retailer, will not permit the product to be sold beneath a certain price. If this is the case, the electronic price tag 10A–10C can be encoded so that the price tag locks at a certain preset price, thereby assuring the retailer that he will not sell the product below the fair market price and breach his contract and the good will that has developed with the manufacturer of the goods.

As the prices are adjusted to sell the product, each earlier price under which the product was offered is still displayed. Any number of price display fields can be manufactured into the electronic price tag as needed by the retailer.

The electronic price tag can have a multiplicity of electronic price display fields 30A–34A which consumers will see to determine the successive markdowns on the products.

The pricing data used with the price tag can be stored in the computer system for subsequent recall for later received goods of a similar nature.

In addition, pricing data can be stored and generated automatically at select periods of time throughout the week, month or whatever time period is designated by the retailer, so that there is an orderly procession of price reduction for goods that remain on the selling floor for an unusual period of time.

It will be understood that the embodiments described herein are merely exemplary and that a person skilled in the art may make many variations and modifications without departing from the spirit and scope of the invention. All such modification and variations of the invention are intended to be covered in the appended claims.

What is claimed is:

1. An electronic price tag adjustable from a remote location, consisting of:
   support means for attachment to a specific product at a point of manufacture/distribution for the product for which the electronic price tag is associated;
   electronic display means mounted on the support means for displaying adjustable pricing information;
   power supply means mounted on the support means for supplying power to the electronic display means;
   said electronic price tag further consisting of a longitudinal member having a recess formed therein for receiving the power supply means, the longitudinal member constructed and arranged for being mounted to a surface of the support means for sandwiching the power supply means between the longitudinal member and the support means surface opposite to a surface to which the electronic display means is mounted on the support means.

2. The electronic price tag according to claim 1, wherein the electronic display means further consists of:
   receiving means mounted on said support means for receiving remotely transmitted pricing signals; and
   means for processing said remotely transmitted pricing signals and selecting only signals associated with the specific product,
   said processing means actuating said electronic display means for displaying said adjustable pricing information.

3. The electronic price tag according to claim 2, further consisting of:
   stand-by means for applying remotely transmitted signals to actuate said processing means only for signals associated with the specific product.

4. The electronic price tag according to claim 1, wherein said electronic display means consists of at least one liquid crystal display device for displaying adjustable pricing information.

5. The electronic price tag according to claim 1, wherein the support means further consists of: a panel of non-conductive material.

6. The electronic price tag according to claim 1, wherein the support means further consists of:
   an aperture extending therethrough for receiving a strap for attachment to the product.

7. The electronic price tag according to claim 1, wherein the support means further consists of:
   adhesive at an exterior surface of the support means for attaching the support means to the product.

8. The electronic price tag according to claim 1, wherein the electronic display means consists of a liquid crystal display (LCD) region.

9. The electronic price tag according to claim 8, wherein the LCD region consists of a plurality of LCD display fields for displaying successive changes in pricing information.

10. The electronic price tag according to claim 1, further consisting of:
    printed indicia displayed on a surface of the support means, the printed indicia identifying a retailer, the product, and characteristics of the product to which the support means is attached.

11. The electronic price tag according to claim 1, further consisting of:
    a sheet of adhesive material mounted to a surface of the support means to sandwich the power supply means between the adhesive material sheet and the support means.

12. An electronic price tag adjustable from a remote location, consisting of:
    support means for attachment to a specific product at a point of manufacture/distribution for the product for which the electronic price tag is associated;
    electronic display means mounted on the support means for displaying adjustable pricing information;
    power supply means mounted on the support means for supplying power to electronic display means; and
    a longitudinal member having a recess formed therein for receiving the power supply means,
    the longitudinal member constructed and arranged for being mounted to a surface of the support means for sandwiching the power supply means between the longitudinal member and the support means surface opposite to a surface to which the electronic display means is mounted on the support means.

13. An electronic price tag adjustable from a remote location, consisting of:
    support means for attachment to a product at a point of manufacture/distribution for the product for which the electronic price tag is associated,
    said support means having a surface receptive to the printing of indicia from external means;
    display means mounted on the support means and actuated by electronic signals corresponding to the product for displaying adjustable pricing information for the product; and
    power supply means mounted on the support means for supplying power to the display means.

14. A price tag adjustable from a remote location, consisting of:
    a container having a front surface and a rear surface;
    a space in the container disposed between the front and rear surfaces; and
    an electronic display package for indicia pertaining to a product, the electronic display package constructed and arranged to be disposed in the space of the container for displaying indicia pertaining to the product to which the tag is attached, and
    responsive to wireless signals with data encoded corresponding to the product to which the tag is associated for actuation of the electronic display package.

15. A method of manufacturing a price tag adjustable from a remote location, the method consisting of the steps of:
    assembling a paperboard package having a space therein;
    disposing in the space an electronic package for electronically displaying
    indicia specific to a product and to which the tag is mounted; and
    enclosing the electronic display package in the space within the paperboard
    package, the electronic display package responsive to wireless signals corresponding to the product for displaying the indicia to an exterior of the price tag.

* * * * *